US012806092B2

(12) United States Patent
Beitenman et al.

(10) Patent No.: US 12,806,092 B2
(45) Date of Patent: Nov. 24, 2026

(54) WHEEL CHAIR MULTI-MOUNT ACCESSORY

(71) Applicant: United States Government as Represented by the Department of Veterans Affairs, Washington, DC (US)

(72) Inventors: Nikki Beitenman, North Charleston, SC (US); David Gatlin, North Charleston, SC (US); Jose Rodriguez, North Charleston, SC (US); Bethany Baldwin, North Charleston, SC (US)

(73) Assignee: United States Government as represented by the Department of Veterans Affairs, Washington, DC (US)

( * ) Notice: Subject to any disclaimer, the term of this patent is extended or adjusted under 35 U.S.C. 154(b) by 568 days.

(21) Appl. No.: 18/337,355

(22) Filed: Jun. 19, 2023

(65) Prior Publication Data

US 2023/0404824 A1 Dec. 21, 2023

Related U.S. Application Data

(60) Provisional application No. 63/353,271, filed on Jun. 17, 2022.

(51) Int. Cl.
*A61G 5/14* (2006.01)

(52) U.S. Cl.
CPC .................................... *A61G 5/14* (2013.01)

(58) Field of Classification Search
CPC ................................ A61G 5/10; A61G 5/1094
See application file for complete search history.

(56) References Cited

U.S. PATENT DOCUMENTS

| | | | | | |
|---|---|---|---|---|---|
| 4,086,859 | A * | 5/1978 | Dondero | A47B 11/00 | 108/142 |
| 4,458,870 | A * | 7/1984 | Duncan | A61G 5/10 | 248/279.1 |
| D276,043 | S * | 10/1984 | Fitzner | D14/229 | |
| 4,580,803 | A * | 4/1986 | Davis | A61G 5/10 | 224/407 |
| 4,878,685 | A * | 11/1989 | Bahm | A61G 5/1094 | 108/90 |
| 4,913,393 | A * | 4/1990 | Wood | A61G 5/10 | 248/283.1 |

(Continued)

OTHER PUBLICATIONS

Adventuresportu, "How to Install an Adjustable Stem on Bike," YouTube, published Sep. 20, 2020, available at https://www.youtube.com/watch?v=_boc8aaNPdM (Year: 2020).*

(Continued)

*Primary Examiner* — Christopher B Wehrly
(74) *Attorney, Agent, or Firm* — Ballard Spahr LLP

(57) ABSTRACT

An accessory adapter for a wheelchair having a chassis, a mounting bracket and a foot platform. The adapter includes a base mount having a bracket engagement portion for engaging the mounting bracket and an extension engagement portion for engaging an extension member. The extension member includes a first and second extension engagement feature for engaging the mounting bracket and an accessory member respectively.

19 Claims, 9 Drawing Sheets

(56) References Cited

U.S. PATENT DOCUMENTS

| | | | | | |
|---|---|---|---|---|---|
| 5,197,394 | A * | 3/1993 | Schmidt | A47B 13/16 | 108/150 |
| 5,228,711 | A * | 7/1993 | Summers | A61G 5/1094 | 297/161 |
| 5,476,241 | A * | 12/1995 | Helman | F16M 11/24 | 248/286.1 |
| 5,664,266 | A * | 9/1997 | Williams | A61G 7/1019 | 5/83.1 |
| 5,881,936 | A * | 3/1999 | Li | B62J 9/21 | 224/430 |
| 5,947,416 | A * | 9/1999 | Kraft | B64D 11/00 | 108/42 |
| 5,996,511 | A * | 12/1999 | Swoger | A47B 57/26 | 108/151 |
| 6,123,206 | A * | 9/2000 | Zaremba | A47B 57/26 | 211/205 |
| 6,123,306 | A * | 9/2000 | Jackson | F16M 11/28 | 248/296.1 |
| 6,138,970 | A * | 10/2000 | Sohrt | F16M 11/10 | 248/278.1 |
| 6,685,264 | B2 * | 2/2004 | Mullen | A61G 5/1094 | 297/173 |
| D626,238 | S * | 10/2010 | Zinnanti | D24/185 | |
| 7,976,049 | B2 * | 7/2011 | Chiu | A61G 5/047 | 180/13 |
| 8,056,874 | B2 * | 11/2011 | Goodwin | A61G 5/10 | 403/112 |
| 8,136,458 | B1 * | 3/2012 | Cass | D06F 53/005 | 108/42 |
| 8,720,349 | B1 * | 5/2014 | David | A47B 37/04 | 211/133.4 |
| 9,192,214 | B2 * | 11/2015 | Gambill | A45B 23/00 | |
| 9,445,664 | B1 * | 9/2016 | Gapp | A47B 13/003 | |
| D858,204 | S * | 9/2019 | Hu | D7/553.6 | |
| 11,003,057 | B2 * | 5/2021 | Buttimer | F16M 13/022 | |
| 11,865,054 | B1 * | 1/2024 | Golden, Jr. | A61G 5/1094 | |
| 12,082,711 | B2 * | 9/2024 | Kim | A45B 23/00 | |
| 2005/0072711 | A1 * | 4/2005 | Yang | F25D 3/08 | 206/499 |
| 2008/0041282 | A1 * | 2/2008 | Goschy | A61G 5/1054 | 108/44 |
| 2015/0351979 | A1 * | 12/2015 | Conte | A61G 5/1051 | 180/13 |
| 2017/0127842 | A1 * | 5/2017 | Sayed | A61G 5/128 | |
| 2019/0046374 | A1 * | 2/2019 | Golden, Jr. | A61G 5/1083 | |
| 2019/0335893 | A1 * | 11/2019 | Erickson | A47B 37/04 | |
| 2020/0085186 | A1 * | 3/2020 | Winchester | B65D 1/34 | |

OTHER PUBLICATIONS

First Components, "Threaded Headset Removal & Installation—Caged Bearing to Sealed Bearing," YouTube, published Jan. 9, 2020, available at https://www.youtube.com/watch?v=6kDUUufn8nE (Year: 2020).*

Elassar, Alaa. "A team of high schoolers built a device that allows people in wheelchairs to walk their babies." (CNN). (published Jul. 25, 2021) (retrieved from https://www.cnn.com/2021/07/25/US/wheelchair-stroller-high-school-baby-teacher/index.html on Nov. 24, 2021).

"ADA LAP System: Wheelchair Accessories: Symmetric Designs ADA Lap System." (medicaleshop). (retrieved from https://www.medicaleshop.com/symmetric-designs-ada-lap-system on Nov. 24, 2021).

"Front or Rear Basket with Mounting Bracket for Wheelchair." (Amazon.com). (retrieved from https://www.amazon.com/Front-Basket-Mounting-Bracket-Wheelchair/dp/B093L5Y5D1 on Nov. 24, 2021).

"Scotty Kristen Wheelchair Tray." (RehabMart.com). (retrieved from https://www.rehabmart.com/product/scotty-kristen-wheelchair-tray-40348.html on Nov. 24, 2021).

"Umbrella Attachment Clamp Supporter Connector Holder For Bar Wheelchair Scooter." (Walmart.com) (retrieved from https://www.walmart.com/ip/Umbrella-Attachment-Clamp-Supporter-Connector-Holder-For-Bar-Wheelchair-Scooter/987731733 on Nov. 24, 2021).

* cited by examiner

WHEEL CHAIR MULTI-MOUNT ACCESSORY

CROSS-REFERENCE TO RELATED APPLICATION

This application claims priority to and the benefit of the filing date of U.S. Provisional Patent Application No. 63/353,271, filed Jun. 17, 2022, the entire contents of which are hereby incorporated herein by reference.

FIELD

This disclosure relates to a multi-mount accessory adapter for a wheelchair. In particular, this disclosure relates to an accessory adapter for a wheelchair that allows ingress and egress from the wheelchair when not in use.

BACKGROUND

Powered wheelchairs provide mobility to those with ambulatory challenges. They provide a lifeline for not only transportation but also many day-to-day uses. These wheelchairs may include tabletops to allow for eating, reading, and other daily utilities. They may also include items such as baskets to facilitate shopping and for the transportation of other possessions. Existing solutions mounting such accessories to powered wheelchairs often pose challenges both to use as well as assembly and disassembly when not needed.

It is known to mount lap trays to the arms of a wheelchair in order to provide a useful table for the user. However, mounting a tray to the arms may cause damage to the wheelchair arms and also interfere with the use of the arms as a resting spot while using the table. Similarly, baskets are useful during shopping but are commonly mounted in locates that pose challenges to ease of use. Baskets are often mounted behind the operator which does not allow easy access when shopping. Additionally complex mounting structures may prove difficult for some users to attach without third party support. This, in turn, interferes with the independence that the powered wheelchair is intended to provide. Also, complex mounting structures may interfere with the wheelchair operator from entering or exiting the wheelchair when mounted in a position in front of the operator.

It would therefore be desirable to have a multi-mount accessory adapter for a powered wheelchair that was designed to allow multiple accessories to mount on and off as the operator sees fit. It would further be desirable for such a multi-mount accessory adapter to have a simple but semi-permanent mount to allow the operator to switch out each accessory on their own and provides more independence doing everyday tasks. Additionally it would be desirable for the simple but semi-permanent mount to be positioned on the powered wheelchair such that it does not interfere with the operators entry onto or exit from the wheelchair when the accessories are not deployed.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Figure 1:
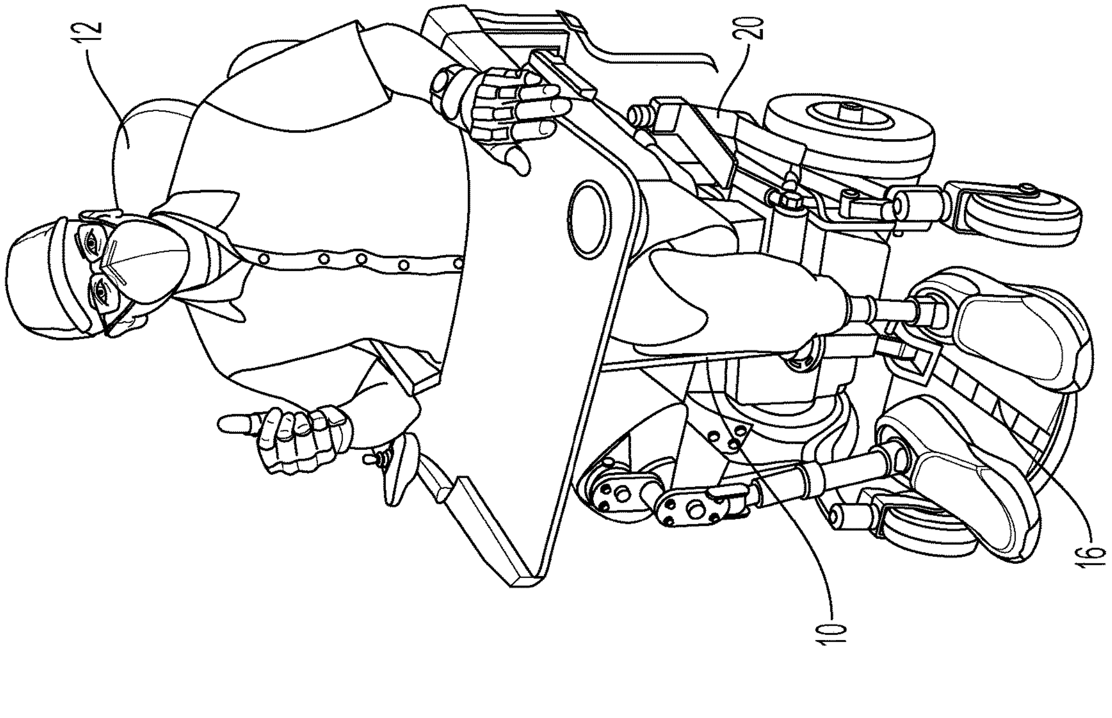
FIG. 1 is photograph of an exemplary accessory adapter for a wheelchair according to the disclosure.
Figure 2:
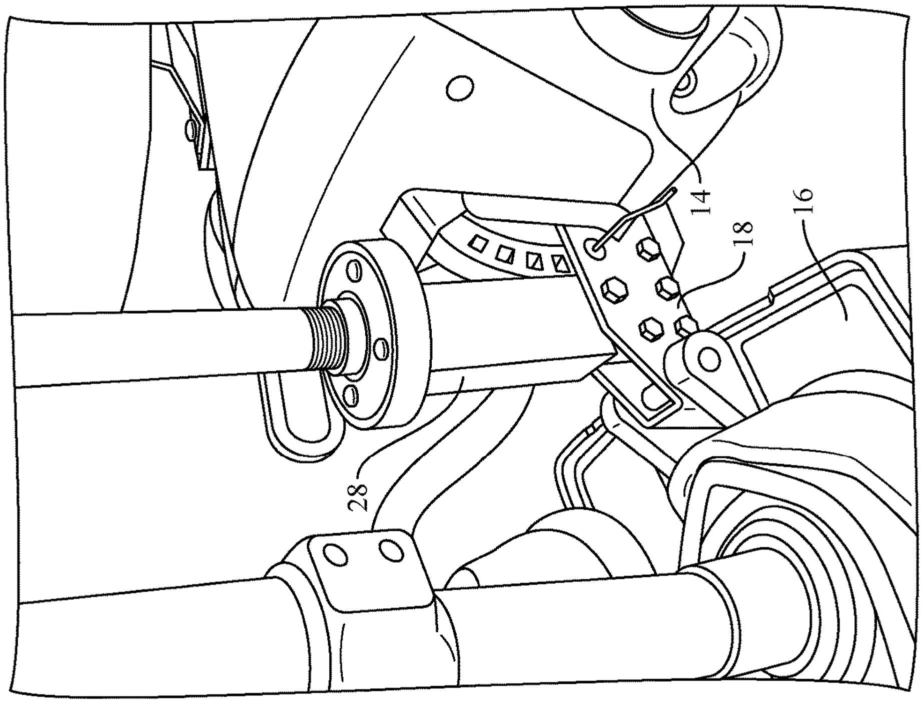
FIG. 2 is a detailed view of the accessory adapter shown in FIG. 1, the detailed view illustrating the base mount attached to the mounting bracket of the wheelchair.
Figure 3:
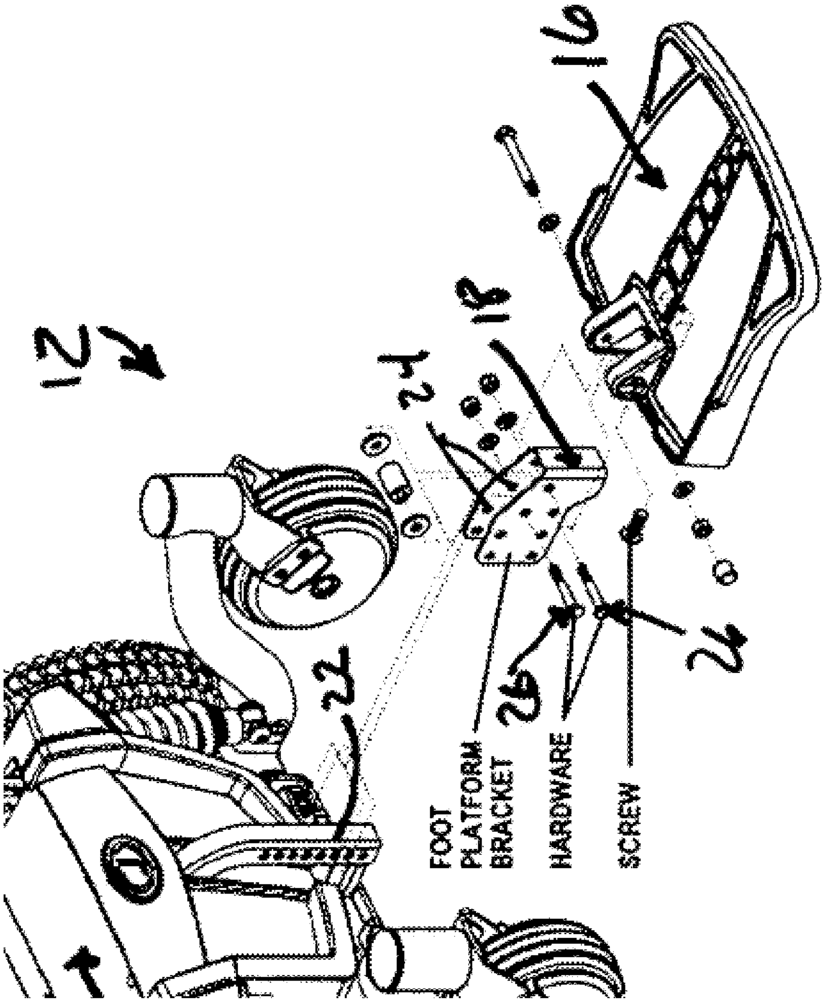
FIG. 3 is an exploded view of a wheelchair as shown in FIG. 1.

FIGS. 1-3 show an example of an accessory adapter 10 according the disclosure. The accessory adapter 10 is shown mounted on a motorized wheelchair 12. In one aspect, the motorized wheelchair 12 may include a chassis 14 and a foot platform 16 with a mounting bracket 18 affixing the foot platform 16 to the chassis 14. In another aspect, the wheelchair 12 may comprise or consist of a chassis 14 and a seat 20. Although a motorized wheelchair 12 is depicted, in other aspects of the disclosure any type of wheelchair 12 may be accommodated by the disclosure provided it includes a chassis 14 for mounting the accessory adapter 10. This includes, but is not limited to non-motorized wheelchairs as well as other mobility devices suited to address those with ambulatory challenges. In one specific aspect shown in FIG. 3, the wheelchair 12 includes an adjustable height mounting bar 22 attached to the chassis 14. The mounting bracket 18 includes a plurality of mounting bracket passages 24 formed therein to accommodate a plurality of fasteners 26. The mounting bracket passages 24 and the fasteners 26 may be used to attach the mounting bracket 18 to the chassis 14 by engagement of the fasteners 26 to the adjustable height mounting bar 22. In addition the bracket passages 24 and fasteners 26 may be used to mount the foot platform 16 to the mounting bracket 18.

Figure 4:
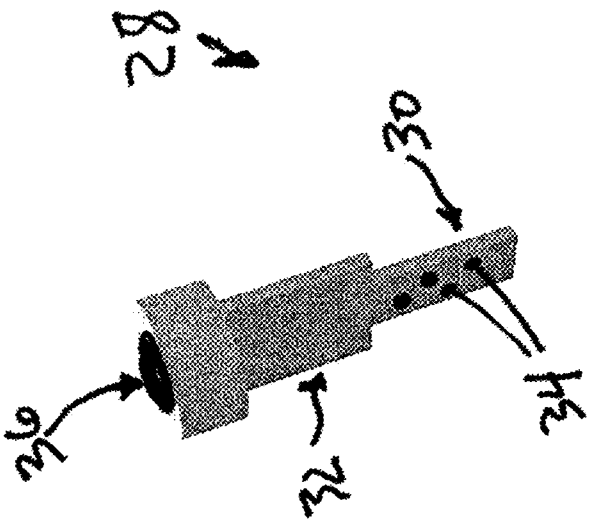
FIG. 4 is detailed view of the base mount shown in FIG. 2.
Figure 5:
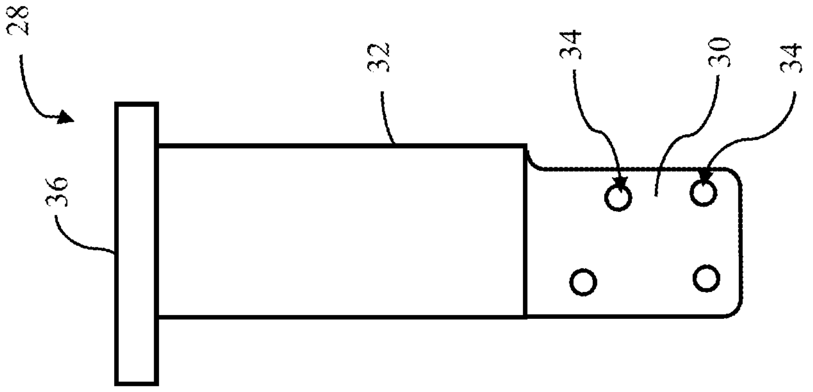
FIG. 5 is an additional detailed view of the base mount shown in FIG. 2.

FIGS. 2, 4 and 5 show an example of a base mount 28 for use with the accessory adapter 10 according to the disclosure. The base mount 28, in one aspect, may include a bracket engagement portion 30 and an extension engagement portion 32. The bracket engagement portion 30 may include a plurality of base mount passages 34 formed therein. The plurality of base mount passages 34 may be arranged to align with the bracket passages 24 when the base mount 28 is positioned within the mounting bracket 18. In this fashion, the fasteners 26 may be utilized to semi-permanently mount the base mount 28 to the mounting bracket 18. A base mount engagement feature 36 may be positioned on the extension engagement portion 32 (see FIG. 2 and FIG. 10). In one aspect, the base mount 28 may be left mounted to the mounting bracket 18 at all times when the remaining portions of the accessory adapter 10 are not required. In this aspect, it is contemplated that the extension engagement portion 32 only extend in a limited height above the mounting bracket 18 so as to allow easy ingress and egress from the wheelchair 12 even when the base mount 28 is attached. In one aspect the extension engagement portion 32 extends less than ten inches above the mounting bracket 18. In another aspect, the extension engagement portion 32 extends to a position less than half the distance between the mounting bracket 18 and the seat 20. In other aspects, the extension engagement portion 32 extends to a position above the mounting bracket 18 wherein the extension engagement portion will not interfere with an operator's upper thighs or knees when the operator exits the wheelchair 12.

Figure 6:
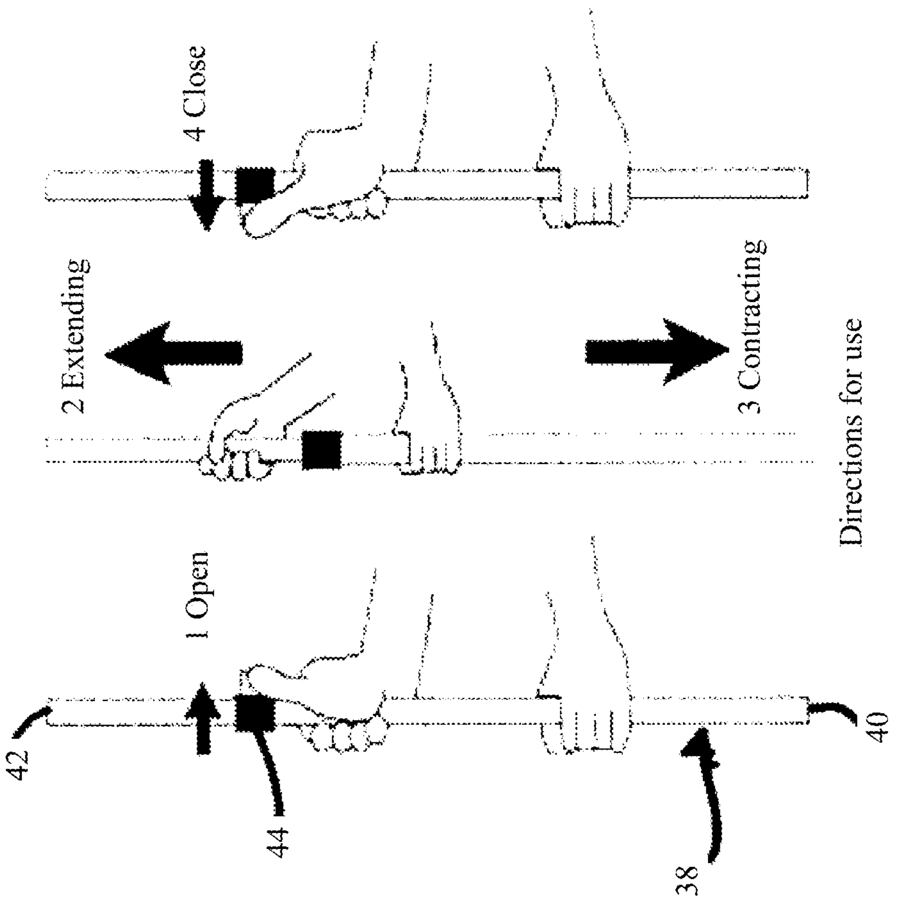
FIG. 6 is an illustration of an exemplary telescoping member for use with the accessory adapter shown in FIG. 1.

FIG. 6 shows an extension member 38 for use with the accessory adapter 10 according to the disclosure. The extension member 38 may include a first extension engagement feature 40 and a second extension engagement feature 42. In one aspect, the extension member 38 may be any elongated member configured to removably engage the base mount 28. In one particular aspect, the extension member 38 may comprise a telescoping member 38, as shown, having a telescoping locking element 44. In still another aspect, the extension member 38 may comprise a tubular telescoping member 38. The first extension engagement feature 40 is configured to removably engage the base mount engagement feature 36. This may allow an operator of the wheelchair 12 to attach the extension member 38 to the base mount engagement feature 36 only when accessories are required to be attached to the wheelchair 12. When accessories are no longer needed, the operator may simply remove the extension member 38 from the base mount engagement feature 36, leaving only the base mount 28 attached to the wheelchair 12. In one aspect, the operator may adjust the length of the telescoping member 38 such that the second extension engagement feature 42 is at the desired height and then engage the telescoping locking element 44.

Figure 8:
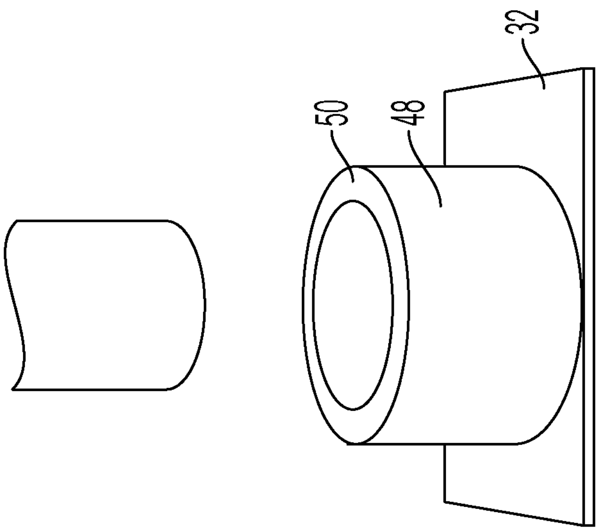
FIG. 8 is a detailed view of an exemplary accessory adapter, the detailed view showing the base mount engagement feature as a frictional engagement fitting.
Figure 7:
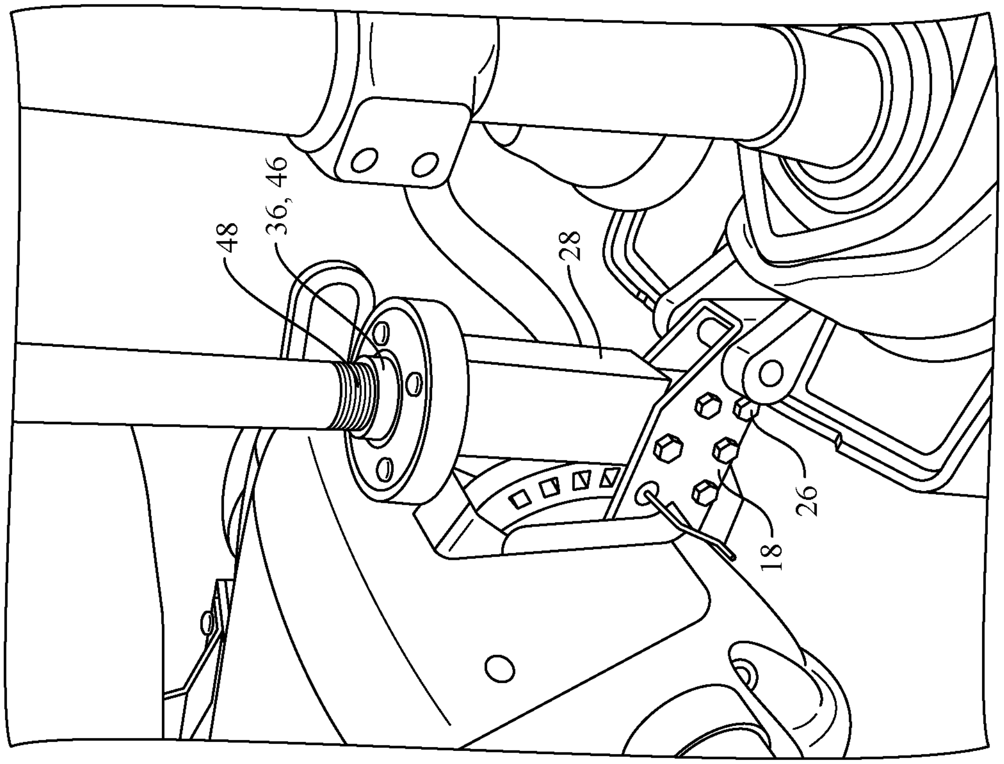
FIG. 7 is a detailed view of an exemplary accessory adapter, the detailed view showing the base mount engagement feature as a threaded fitting.
Figure 9:
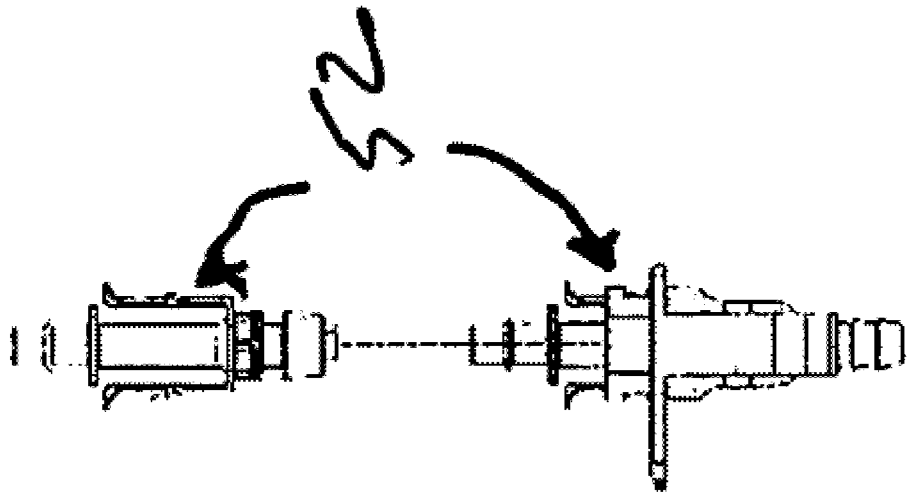
FIG. 9 is a detailed view of an exemplary accessory adapter, the detailed view showing the base mount engagement feature as a quick disconnect coupling.
Figure 10:
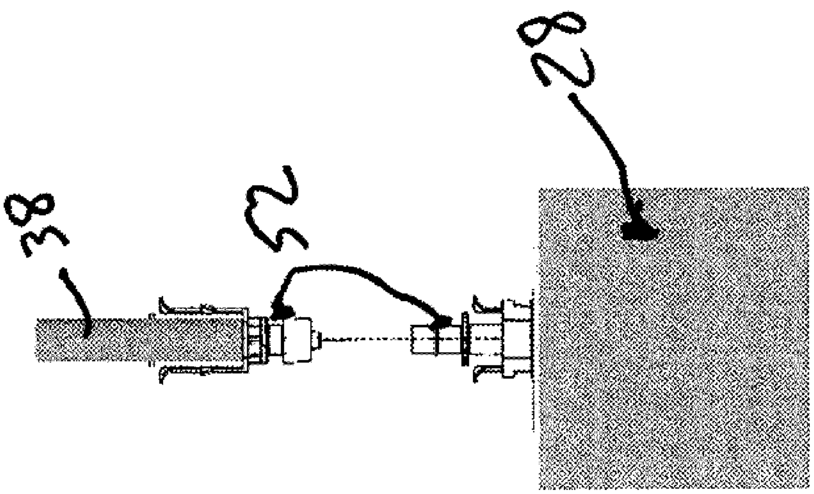
FIG. 10 is a side view of an exemplary quick disconnect coupling, which is shown mounted to a telescoping member and base mount as disclosed herein.
Figure 11:
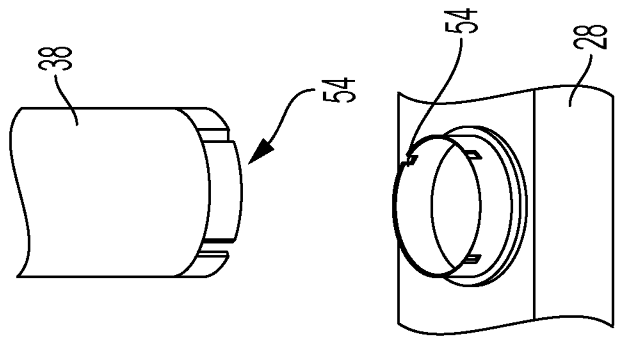
FIG. 11 is a detailed view of an exemplary accessory adapter, the detailed view showing the base mount engagement feature as a push to connect twist to lock fitting.

It is contemplated that the first extension engagement feature 40 may be configured to removably engage the base mount engagement feature 36 in a variety of aspects. In one aspect shown in FIG. 7, the base mount engagement feature 36 may comprise a threaded fitting 46 that engages an extension threading 48 formed on the extension member. In another aspect shown in FIG. 8, the base mount engagement feature 40 nay comprise a frictional engagement fitting 50 that secures the extension member 38. As shown in FIGS. 9 and 10, it is contemplated that the base mount engagement feature 40 may comprise a quick disconnect coupling 52. As shown in FIG. 11, it is contemplated that the mount engagement feature 40 may comprise a push-to-connect, twist-to-lock fitting 54. In use, each of these aspects can allow the operator of the wheelchair 12 to quickly and reliably attach the extension member 38 to the base mount 28 with little effort. This is beneficial for many operators who have limited use of their upper body.

Figure 13:
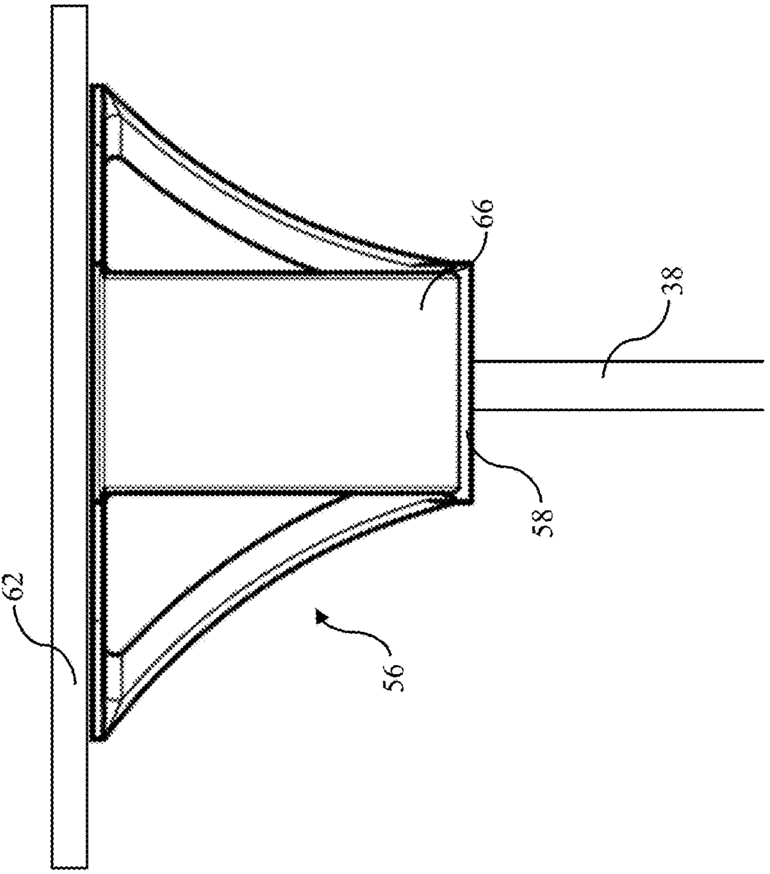
FIG. 13 is a side view of a telescoping member, a brace assembly, and a universal platform for use with the accessory adapter shown in FIG. 1.
Figure 12:
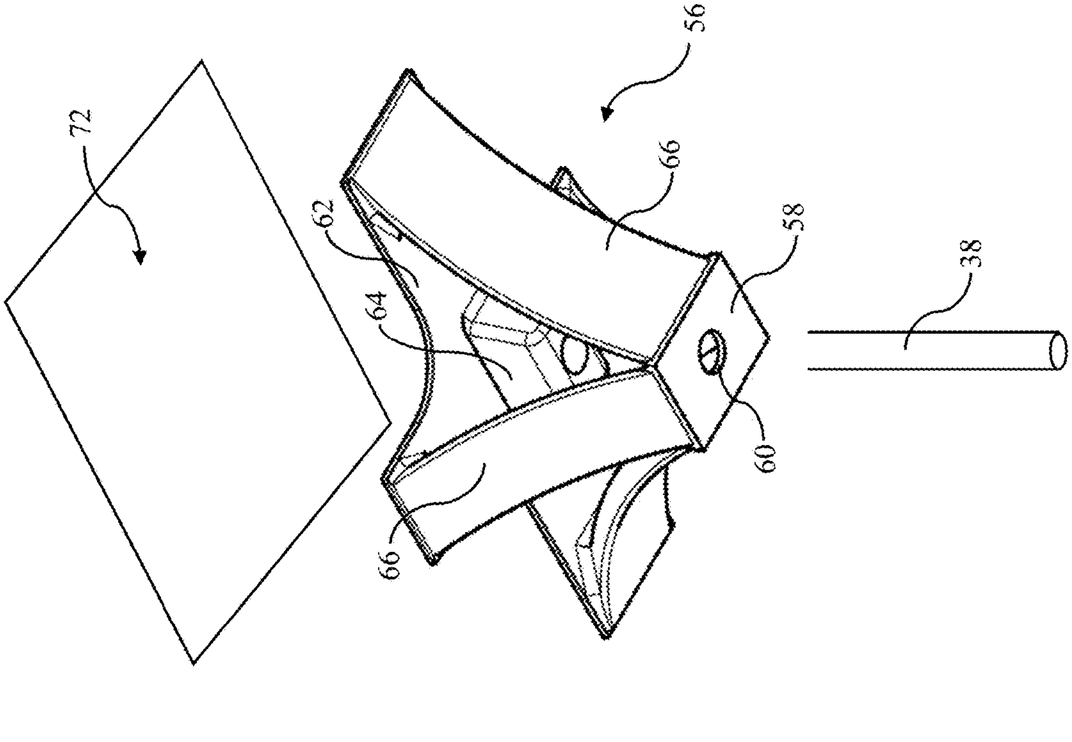
FIG. 12 is an exploded view of a telescoping member, a brace assembly, and a universal platform for use with the accessory adapter shown in FIG. 1.
Figure 15:
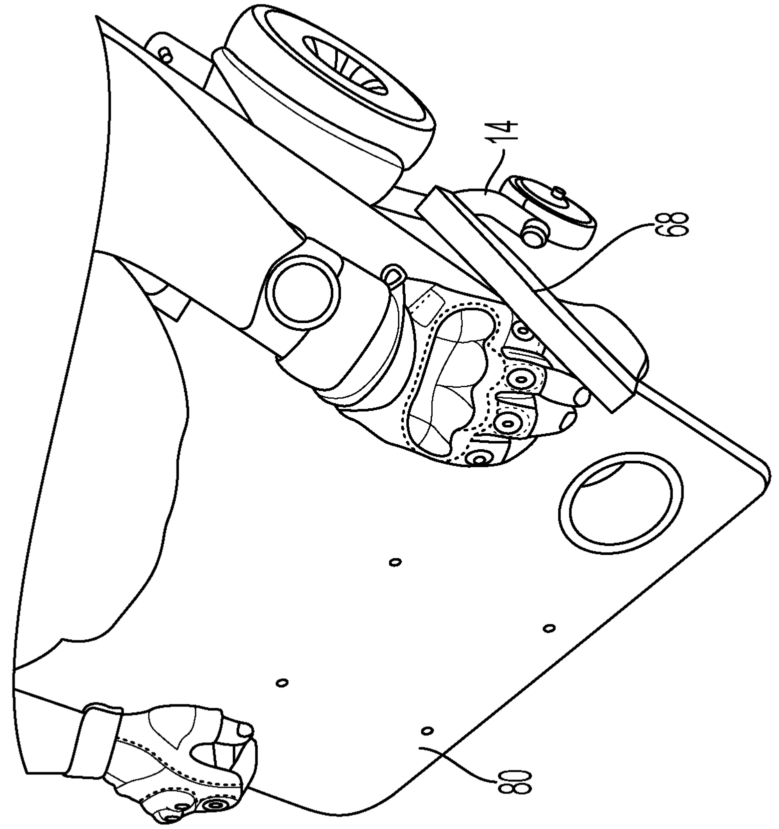
FIG. 15 is a detailed view of an exemplary accessory adapter, the detailed view showing a brace assembly comprised of a plurality of rotatable stabilizer bars.
Figure 14:
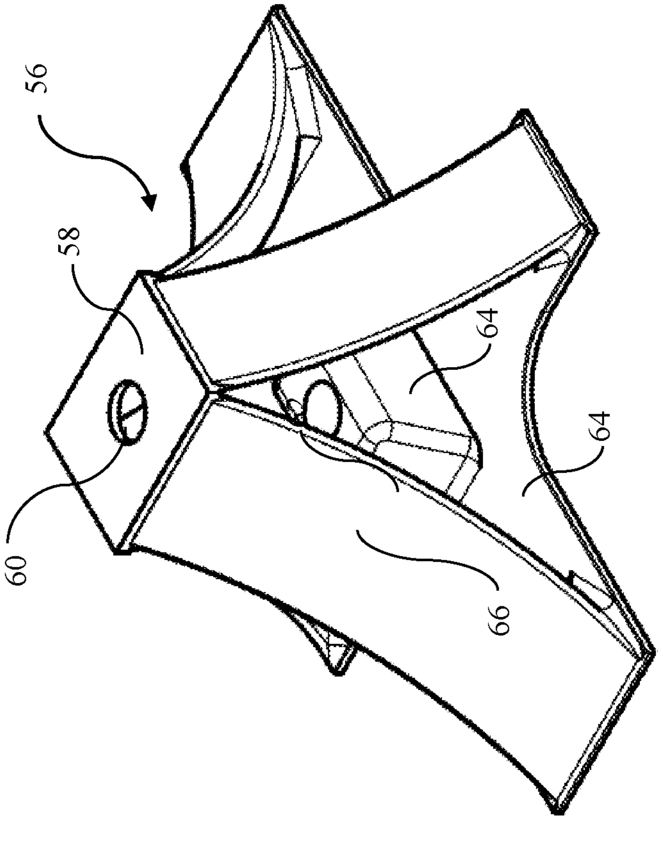
FIG. 14 is an isometric view of an exemplary brace assembly as disclosed herein.
Figure 16:
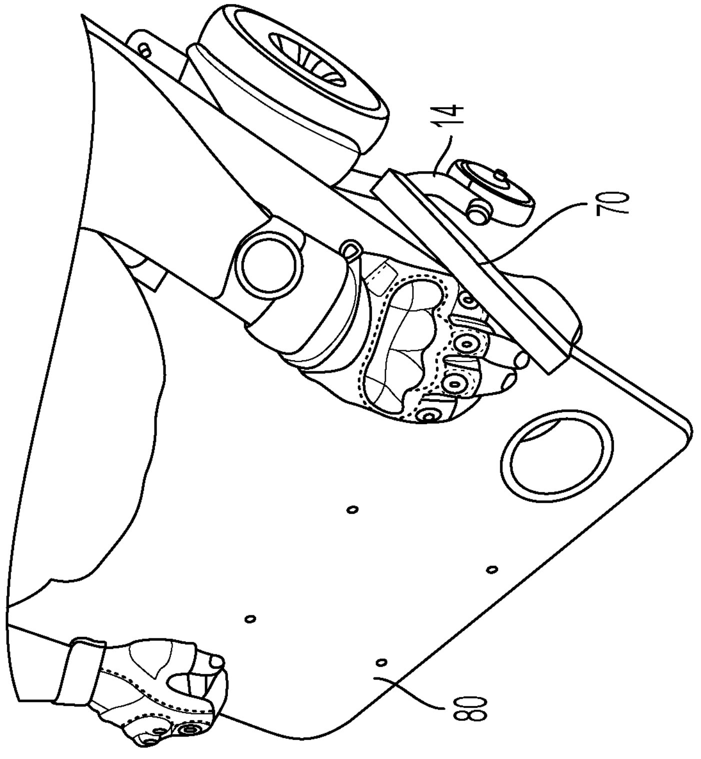
FIG. 16 is a detailed view of an exemplary accessory adapter, the detailed view showing a brace assembly comprised of a plurality of straps.

In one aspect, the extension member 38 may be used in combination with a brace assembly 56 as shown in FIGS. 12-14. In one aspect, the brace assembly 56 may be removably mounted to the extension member 38. This allows the operator of a wheelchair 12 to adjust the extension engagement feature 42 to the correct height prior to attachment of the brace assembly 56. The brace assembly 56 may include a lower brace panel 58 having a lower brace guide 60 configured to surround the extension member 38. The brace assembly 56 may further include an upper brace panel 62 including an upper brace engagement mount 64. The upper brace engagement mount 64 is configured to removably engage the second extension engagement feature 42 to secure the brace assembly 56 to the extension member 38. In one aspect, the upper brace panel 62 is configured to frictionally engage the second extension engagement feature 42 to allow for simplified assembly. In other aspects, alternate connection methodologies may be applied. A plurality of brace arms 66 connect the lower brace panel 58 to the upper brace panel 62. The plurality of brace arms 66 stabilize the upper brace panel 62, in combination with the lower brace guide 60 and upper brace engagement mount 64, relative to the extension member 38 to increase stability of any accessories utilized in this disclosure. In one aspect, the upper brace panel 62 is larger than the lower brace panel 58 and the plurality of brace arms 66 are curved brace arms that curve outwardly and upwardly from the lower brace panel 58 to the upper brace panel 62. In another aspect, the plurality of brace arms 66 are curved to distribute torsional loads from heavy accessories to prevent excess stress on the extension member 38. In another aspect of the disclosure shown in FIG. 15, the brace assembly 56 may comprise a plurality of rotatable stabilizer bars 68 that provide support between the chassis 14 and the extension member 38. In another aspect shown in FIG. 16, the brace assembly 56 may comprise a plurality of straps 70 to provide support between the chassis 16 and the extension member 38. The use of these brace assemblies 56 may provide a reduction in flexing of the extension member 38 when under load.

Figure 17:
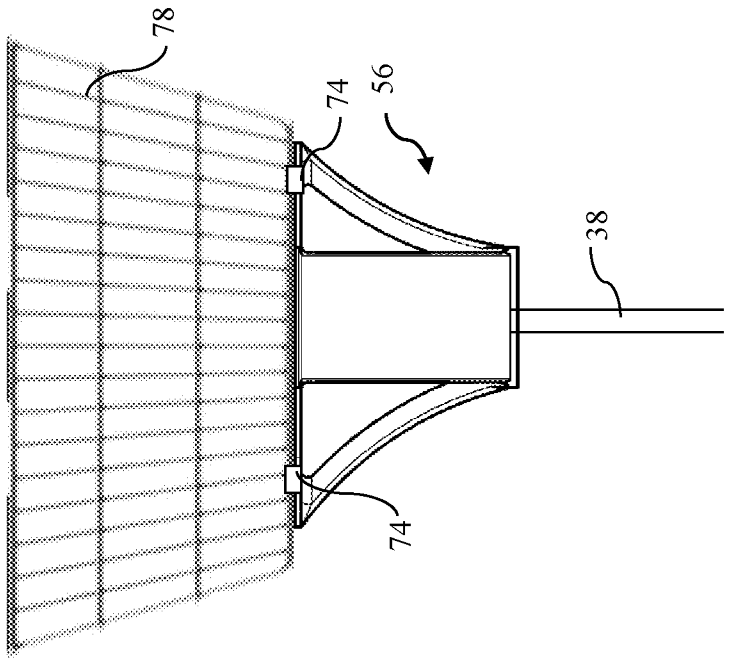
FIG. 17 is a side detailed view of an exemplary accessory adapter, the detailed view showing a basket mounted to the universal platform.
Figure 18:
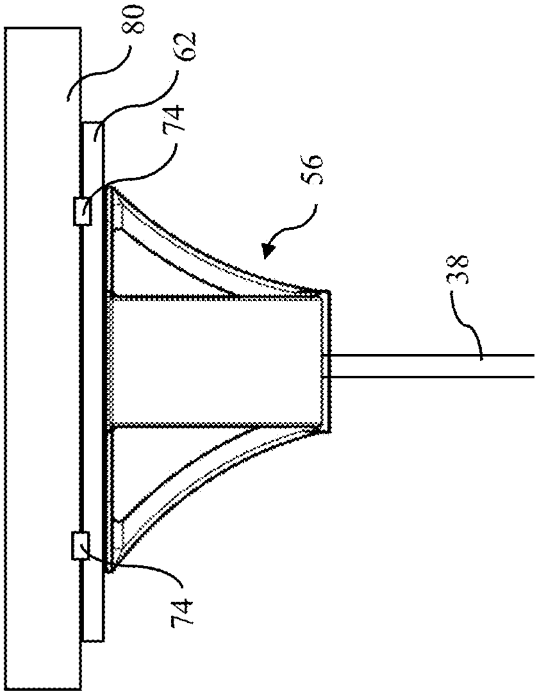
FIG. 18 is side detailed view of an exemplary accessory, the detailed view showing a table mounted to the universal platform.

In one aspect of the disclosure shown in FIG. 12, the accessory adapter 10 may include a universal platform 72 that may be mounted to the upper brace panel 62. In other aspects of the disclosure shown in FIGS. 17 and 18, the upper brace panel 62 itself may form the platform. A plurality of accessory engagement features 74 are positioned on the upper brace panel 62 (or alternately the universal platform 72) and allow a variety of accessories to be secured to the upper brace panel 62 or universal platform 72. The plurality of accessory engagement features 74 can comprise a variety of fixtures including, but not limited to, straps, clamps, magnetic attachments, and tab connections. In at least one aspect shown in FIG. 17, the accessory may comprise a basket 78 that once attached would allow the operator of the wheelchair 12 easy access as it will be located directly in front of them. In another aspect shown in FIG. 18, the accessory may comprise a table 80. In still other embodiments, the accessory can include, but is not limited to a microphone stand, a cooler, camera tripod, a stand for electronic devices such as phones or tables, a laptop stand, or even a directable light (e.g., spotlight).

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An accessory adapter for a wheelchair having a chassis, a mounting bracket, and a foot platform, the accessory adapter comprising:

a base mount comprising a bracket engagement portion, an extension engagement portion and a base mount engagement feature positioned on the extension engagement portion;

an extension member comprising a first extension engagement feature and a second extension engagement feature, the first extension engagement feature removably engaging the extension engagement portion;

an accessory member having an accessory engagement feature in communication with the second extension engagement feature.

Aspect 2: The accessory adapter of aspect 1, wherein the extension engagement portion extends above the mounting bracket less than ten inches when the bracket engagement portion is mounted to the mounting bracket.

Aspect 3: The accessory adapter of aspect 1, wherein the base mount engagement feature comprises a threaded fitting.

Aspect 4: The accessory adapter of aspect 3, wherein the first extension engagement feature comprises a threaded fitting configured to engage the base mount engagement feature.

Aspect 5: The accessory adapter of aspect 1, wherein the base mount engagement feature comprises a frictional engagement fitting.

Aspect 6: The accessory adapter of aspect 1, wherein the base mount engagement feature comprises a quick disconnect coupling.

Aspect 7: The accessory adapter of aspect 1, wherein the base mount engagement feature comprises a push to connect twist to lock fitting.

Aspect 8: The accessory adapter of aspect 1, wherein the extension member comprises a telescoping member.

Aspect 9: The accessory adapter of aspect 8, further comprising:

a telescopic locking element mounted to the telescoping member.

Aspect 10: The accessory adapter of aspect 1, wherein the extension member comprises a telescoping tubular member;

Aspect 11: The accessory adapter of aspect 1, wherein the base mount is fixedly mounted to the mounting bracket.

Aspect 12: The accessory adapter of aspect 11, wherein the accessory member is removably mounted to the extension member.

Aspect 13: The accessory adapter of aspect 1, wherein the accessory member is a table.

Aspect 14: The accessory adapter of aspect 1, wherein the accessory member is a basket.

Aspect 15: The accessory adapter of aspect 1, further comprising:

a brace assembly removably mounted to the extension member.

Aspect 16: The accessory adapter of aspect 15, wherein the brace assembly comprises:

a lower brace panel including a lower brace guide configured to surround the extension member;

an upper brace panel including an upper brace engagement mount, the upper brace engagement mount configured to engage the second extension engagement feature; and a plurality of brace arms connecting the lower brace panel to the upper brace panel.

Aspect 17: The accessory adapter of aspect 16, wherein the plurality of brace arms comprise a plurality of curved brace arms.

Aspect 18: The accessory adapter of aspect 16, wherein the upper brace engagement mount is configured to frictionally engage the second extension engagement feature.

Aspect 19: The accessory adapter of aspect 16, further comprising:

a plurality of upper panel securing elements, the plurality of upper panel securing elements configured to engage the accessory member.

Aspect 20: The accessory adapter of aspect 15, wherein the brace assembly comprises a plurality of straps mounted to the extension member, each of the plurality of straps including at least one strap attachment feature configured to secure to the wheelchair.

Aspect 21: The accessory adapter of aspect 15, wherein the brace assembly comprises a plurality of rotatable stabilizer bars in communication with the extension member and the wheelchair.

Aspect 22: The accessory adapter of aspect 1, further comprising:

a universal platform positioned between the second extension engagement feature and the accessory engagement feature.

Aspect 23: An accessory adapter for a wheelchair having a chassis and a seat, the accessory adapter comprising:

a mounting bracket mounted to the chassis;

a base mount comprising a bracket engagement portion mounted to the mounting bracket, an extension engagement portion extending above the mounting bracket to a position lower than the seat, and a base mount engagement feature positioned on the extension engagement portion;

an extension member comprising a first extension engagement feature and a second extension engagement feature, the first extension engagement feature removably engaging the base mount engagement feature;

an accessory member having an accessory engagement feature in communication with the second extension engagement feature.

Aspect 24: The accessory adapter of aspect 23, wherein the extension engagement portion extends to a position lower than half the distance between the mounting bracket and the seat.

Aspect 25: The accessory adapter of aspect 23, wherein the base mount engagement feature comprises a threaded fitting.

Aspect 26: The accessory adapter of aspect 25, wherein the first extension engagement feature comprises a threaded fitting configured to engage the base mount engagement feature.

Aspect 27: The accessory adapter of aspect 23, wherein the base mount engagement feature comprises a frictional engagement fitting.

Aspect 28: The accessory adapter of aspect 23, wherein the base mount engagement feature comprises a quick disconnect coupling.

Aspect 29: The accessory adapter of aspect 23, wherein the base mount engagement feature comprises a push to connect twist to lock fitting.

Aspect 30: The accessory adapter of aspect 23, wherein the extension member comprises a telescoping member.

Aspect 31: The accessory adapter of aspect 30, further comprising:

a telescopic locking element mounted to the telescoping member.

Aspect 32: The accessory adapter of aspect 23, wherein the extension member comprises a telescoping tubular member;

Aspect 33: The accessory adapter of aspect 23, wherein the accessory member is removably mounted to the extension member.

Aspect 34: The accessory adapter of aspect 23, wherein the accessory member is a table.

Aspect 35: The accessory adapter of aspect 23, wherein the accessory member is a basket.

Aspect 36: The accessory adapter of aspect 23, further comprising:

a brace assembly removably mounted to the extension member.

Aspect 37: The accessory adapter of aspect 36, wherein the brace assembly comprises:

a lower brace panel including a lower brace guide configured to surround the extension member;

an upper brace panel including an upper brace engagement mount, the upper brace engagement mount configured to engage the second extension engagement feature; and a plurality of brace arms connecting the lower brace panel to the upper brace panel.

Aspect 38: The accessory adapter of aspect 37, wherein the plurality of brace arms comprise a plurality of curved brace arms.

Aspect 39: The accessory adapter of aspect 37, wherein the upper brace engagement mount is configured to frictionally engage the second extension engagement feature.

Aspect 40: The accessory adapter of aspect 37, further comprising:

a plurality of upper panel securing elements, the plurality of upper panel securing elements configured to engage the accessory member.

Aspect 41: The accessory adapter of aspect 36, wherein the brace assembly comprises a plurality of straps mounted to the extension member, each of the plurality of straps including at least one strap attachment feature configured to secure to the wheelchair.

Aspect 42: The accessory adapter of aspect 36, wherein the brace assembly comprises a plurality of rotatable stabilizer bars in communication with the extension member and the wheelchair.

Aspect 43: The accessory adapter of aspect 23, further comprising:

a universal platform positioned between the second extension engagement feature and the accessory engagement feature.

Aspect 44: A method of mounting an accessory to a wheelchair, the wheelchair including a chassis, a seat, a mounting bracket, a pair of arm rests, and a foot platform, the method comprising:

mounting a base mount to the mounting bracket, the base mount comprising a bracket engagement portion mounted to the mounting bracket, an extension engagement portion extending above the mounting bracket to a position lower than the seat, and a base mount engagement feature positioned on the extension engagement portion;

removably mounting an extension member to the base mount, the extension member comprising a first extension engagement feature and a second extension engagement feature, the first extension engagement feature removably engaging the base mount engagement feature; and mounting an accessory member to the extension member, the accessory member having an accessory engagement feature engaging the second extension engagement feature;

wherein the base mount extends above the mounting bracket to a position below the seat.

Aspect 45: The method of aspect 44, wherein the extension member comprises a telescoping member, the method further comprising:

extending the telescoping member to raise the accessory member in proximity to the pair of arm rests.

Aspect 46: The method of aspect 44, further comprising:

mounting a universal platform between the second extension engagement feature and the accessory engagement feature.

What is claimed is:

1. An accessory adapter for a wheelchair having a chassis, a mounting bracket comprising a pair of walls, and a foot platform, the accessory adapter comprising:

a base mount comprising a bracket engagement portion, an extension engagement portion and a base mount engagement feature positioned on the extension engagement portion, wherein the bracket engagement portion comprises a body that is receivable between the pair of walls of the mounting bracket along a longitudinal axis of the body, wherein the body defines a plurality of bores extending through the body along respective axes that are transverse to the longitudinal axis;

an extension member comprising a first extension engagement feature and a second extension engagement feature, the first extension engagement feature removably engaging the extension engagement portion; and an accessory member having an accessory engagement feature in communication with the second extension engagement feature, wherein the extension engagement portion has a longitudinal axis and a rectangular cross-section in a plane perpendicular to the longitudinal axis of the extension engagement portion, wherein the body of the bracket engagement portion has a thickness measured parallel to the respective axes of the plurality of bores, wherein a thickness of the extension engagement portion is greater than the thickness of the body of the bracket engagement portion, thereby defining a first shoulder above the body of the bracket engagement portion, wherein the first shoulder forms a lower end of the extension engagement portion, wherein the body of the bracket engagement portion is positioned below the lower end of the extension engagement portion along the longitudinal axis of the extension engagement portion, and wherein the base mount engagement feature comprises a second shoulder extending radially outward from the base mount.

2. The accessory adapter of claim 1, wherein the extension engagement portion extends above the mounting bracket less than ten inches when the bracket engagement portion is mounted to the mounting bracket.

3. The accessory adapter of claim 1, wherein the base mount engagement feature comprises a threaded fitting, and wherein the first extension engagement feature comprises a threaded fitting configured to engage the base mount engagement feature.

4. The accessory adapter of claim 1, wherein the extension member comprises a telescoping member, and wherein the accessory adapter further comprises a telescopic locking element mounted to the telescoping member.

5. The accessory adapter of claim 1, wherein the base mount is fixedly mounted to the mounting bracket, and wherein the accessory member is removably mounted to the extension member.

6. The accessory adapter of claim 1, wherein the accessory member is a table.

7. The accessory adapter of claim 1, wherein the accessory member is a basket.

8. The accessory adapter of claim 1, further comprising:

a brace assembly removably mounted to the extension member.

9. The accessory adapter of claim 8, wherein the brace assembly comprises:

a lower brace panel including a lower brace guide configured to surround the extension member;

an upper brace panel including an upper brace engagement mount, the upper brace engagement mount configured to engage the second extension engagement feature; and a plurality of brace arms connecting the lower brace panel to the upper brace panel.

10. The accessory adapter of claim 9, further comprising:

a plurality of upper panel securing elements, the plurality of upper panel securing elements configured to engage the accessory member.

11. The accessory adapter of claim 8, wherein the brace assembly comprises a plurality of straps mounted to the extension member, each of the plurality of straps including at least one strap attachment feature configured to secure to the wheelchair.

12. The accessory adapter of claim 8, wherein the brace assembly comprises a plurality of rotatable stabilizer bars in communication with the extension member and the wheelchair.

13. The accessory adapter of claim 1, further comprising:

a universal platform positioned between the second extension engagement feature and the accessory engagement feature.

14. An assembly comprising:

the accessory adapter of claim 1;

the mounting bracket comprising the pair of walls, wherein the mounting bracket is mounted to the chassis, wherein the mounting bracket is directly attached to the foot platform so as to couple the foot platform to the chassis, wherein the body of the engagement portion of the accessory adapter is received between the pair of walls of the mounting bracket; and a plurality of fasteners, wherein each fastener of the plurality of fasteners extends through a respective bore of the plurality of bores extending through the body of the bracket engagement portion to thereby mount the bracket engagement portion to the mounting bracket.

15. A method of mounting an accessory to a wheelchair, the wheelchair including a chassis, a seat, a mounting bracket comprising a pair of walls having respective first and second ends, the method comprising:

inserting a body of a bracket engagement portion of a base mount between the pair of walls of the mounting bracket, wherein the body of the bracket engagement portion of the base mount has a longitudinal axis and defines a plurality of bores extending through the body along respective axes that are transverse to the longitudinal axis, wherein the base mount further comprises an extension engagement portion extending above the mounting bracket to a position lower than the seat, and a base mount engagement feature positioned on the extension engagement portion;

inserting each fastener of a plurality of fasteners through a respective bore of the plurality of bores extending through the body of the bracket engagement portion to thereby mount the bracket engagement portion to the mounting bracket;

removably mounting an extension member to the base mount, the extension member comprising a first extension engagement feature and a second extension engagement feature, the first extension engagement feature removably engaging the base mount engagement feature; and mounting an accessory member to the extension member, the accessory member having an accessory engagement feature engaging the second extension engagement feature;

wherein the base mount extends above the mounting bracket to a position below the seat, wherein the wheelchair comprises:

a pair of arm rests; and a foot platform configured to receive two feet of a user, wherein the mounting bracket is positioned between the chassis and the foot platform, wherein the chassis is directly coupled to the first ends of the pair of walls of the mounting bracket, and wherein the foot platform is pivotably coupled to the second ends of the mounting bracket so as to couple the foot platform to the chassis by the mounting bracket, wherein the chassis comprises an adjustable height mounting bar positioned at a centerline of the chassis, wherein the adjustable height mounting bar is coupled to the pair of walls of the mounting bracket.

16. The method of claim 15, wherein the extension member comprises a telescoping member, the method further comprising:

extending the telescoping member to raise the accessory member in proximity to the pair of arm rests.

17. The method of claim 15, further comprising:

mounting a universal platform between the second extension engagement feature and the accessory engagement feature.

18. The accessory adapter of claim 1, wherein the body has a length along the longitudinal axis and a width perpendicular to the length and the thickness, wherein the length is greater than the width, and wherein the width is greater than the thickness.

19. The accessory adapter of claim 1, wherein the extension engagement portion has a width measured along an axis perpendicular to the respective axes of the plurality of bores, wherein the extension engagement portion has a height measured along the longitudinal axis of the extension engagement portion, wherein the width of the extension engagement portion is greater than the thickness of the extension engagement portion, and wherein the height of the extension engagement portion is greater than the width of the extension engagement portion.

* * * * *